Sept. 6, 1949.    S. E. NIELSEN    2,481,145
HAND CART WITH LOAD FASTENER
Filed Sept. 3, 1946    4 Sheets-Sheet 1
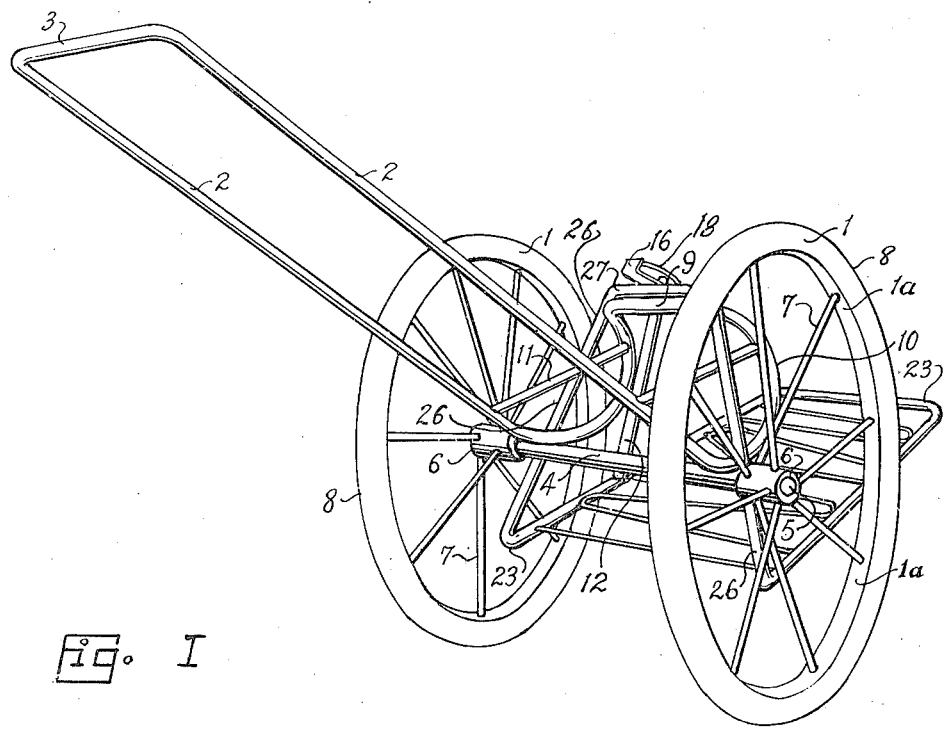
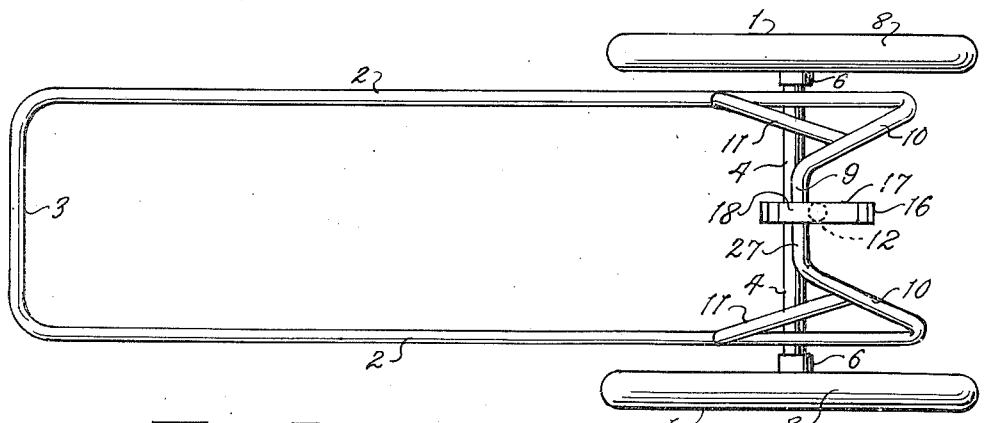
Sidney E. Nielsen
INVENTOR.
BY
ATTORNEY

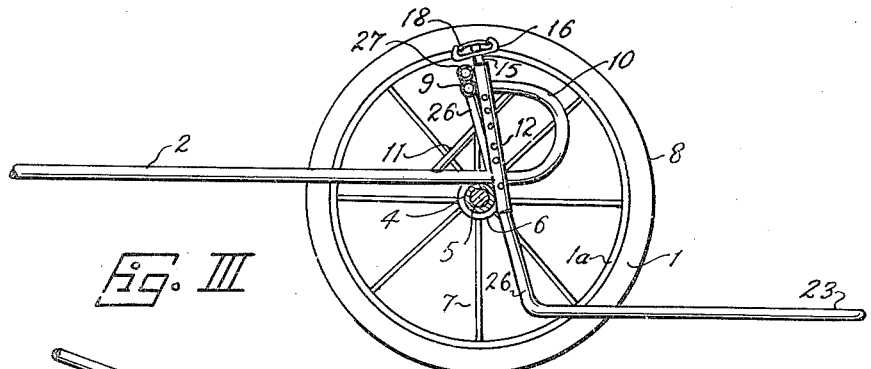
Fig. III
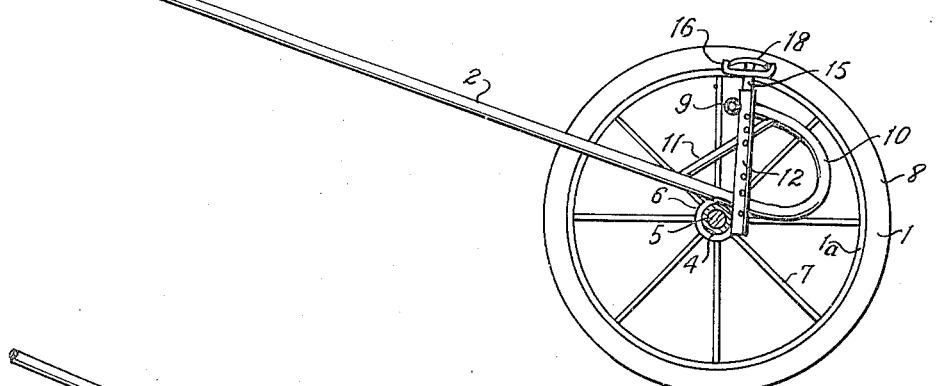
Fig. IV
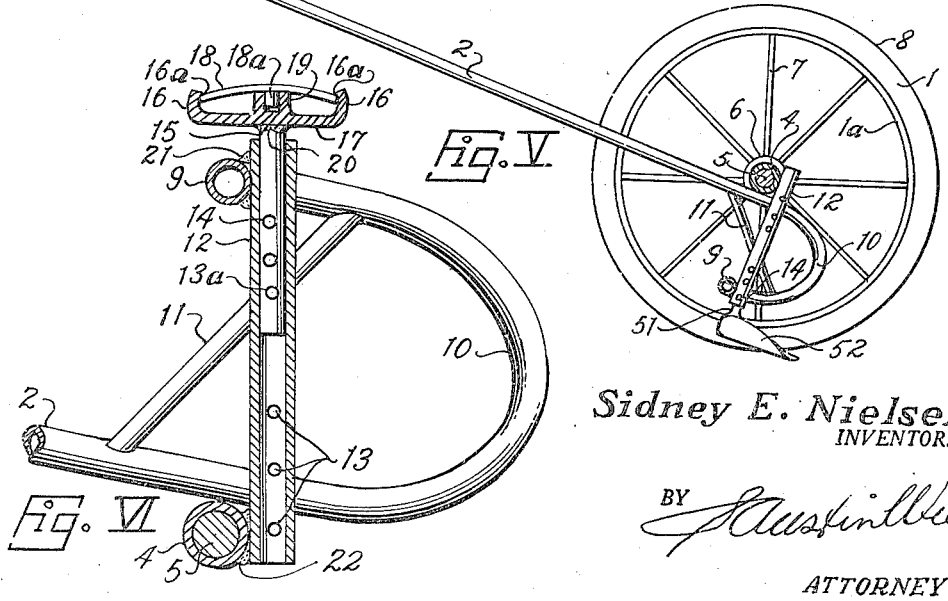
Fig. V
Fig. VI
Sidney E. Nielsen
INVENTOR.
BY *[signature]*
ATTORNEY Sept. 6, 1949. S. E. NIELSEN 2,481,145
HAND CART WITH LOAD FASTENER
Filed Sept. 3, 1946 4 Sheets-Sheet 3
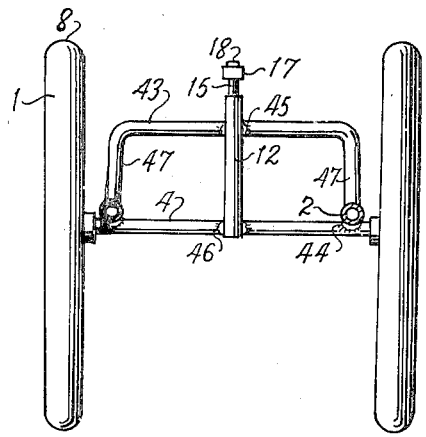
Fig. XII
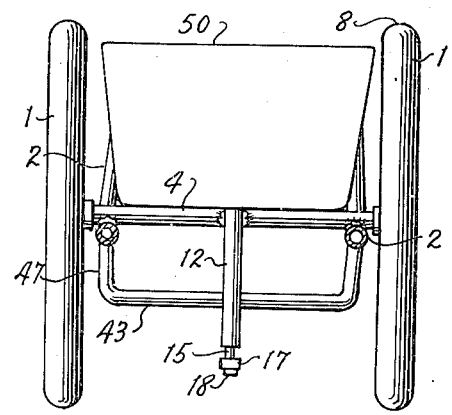
Fig. XIII
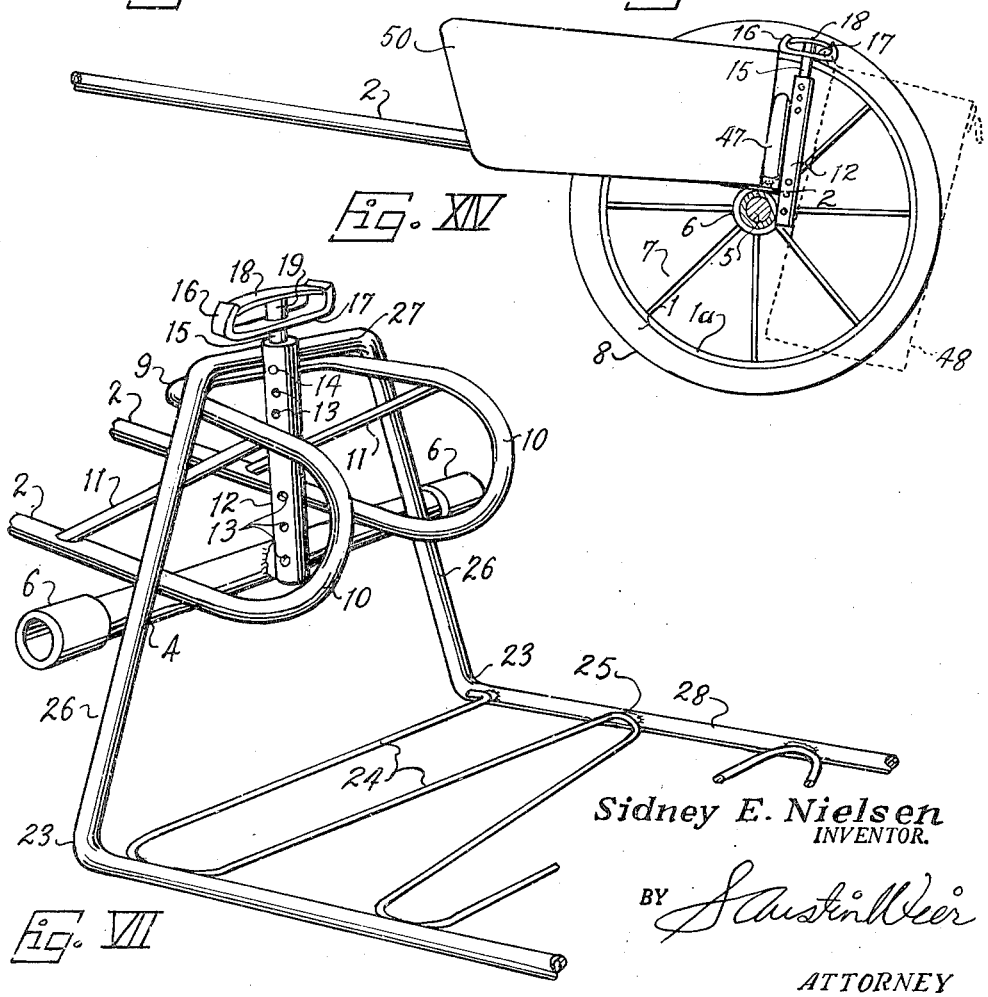
Sidney E. Nielsen
INVENTOR.
BY S. Austin Weir
ATTORNEY Sept. 6, 1949.  S. E. NIELSEN  2,481,145
HAND CART WITH LOAD FASTENER
Filed Sept. 3, 1946  4 Sheets-Sheet 4
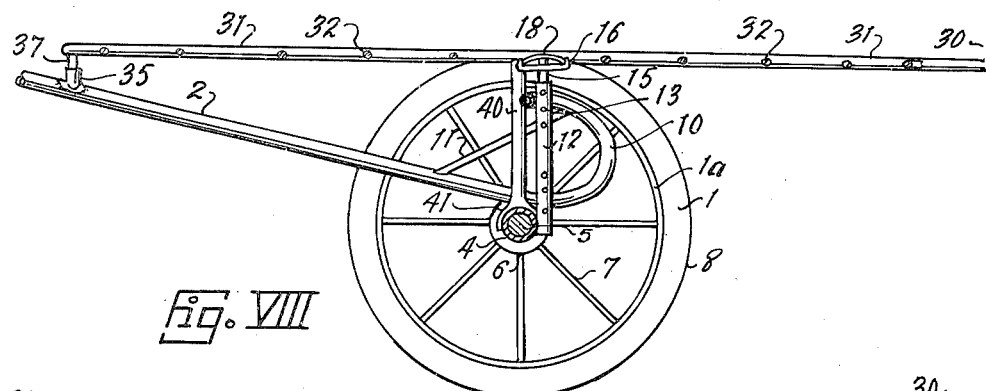
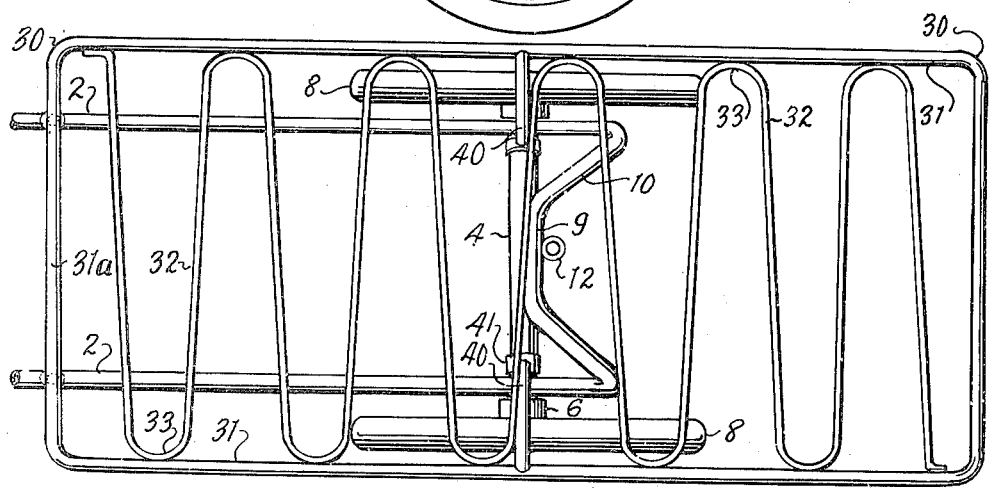
Sidney E. Nielsen
INVENTOR.
BY
ATTORNEY Patented Sept. 6, 1949

2,481,145

UNITED STATES PATENT OFFICE 2,481,145

HAND CART WITH LOAD FASTENER

Sidney E. Nielsen, Shreveport, La.

Application September 3, 1946, Serial No. 694,515

1 Claim. (Cl. 280—49)

This invention has to do with a general purpose vehicle which has many uses. It is of general utility on farms and ranches, in gardening and dairy operations, as a push cart around town, and in removing trash and garbage.

The usual wheeled vehicle available in the past has ordinarily been built especially for some particular task, such as the transporting of barrels or milk cans or boxes. The result has been that such individual vehicles have not had a wide utilization; and several different vehicles were bought by the same user, each for a different task.

Where shafts or handles were used to push the vehicle, it has usually been necessary to provide such shafts with legs, to keep them up out of the dirt. The old style vehicles were so improperly balanced that usually most of the weight was carried to the rear of the axle, as in a wheelbarrow; and this required the operator to lift considerable weight while pushing the vehicle, and also allowed the handles to fall to the ground.

Other unsatisfactory devices, of this general class, frequently allowed most of the weight to fall entirely in front of the axle, as in a beer-barrel cart.

My general utility vehicle has, as an object, such design and construction that slightly more of the weight of the load is carried in advance of the axle. This means that the operator does not exert any energy in lifting the vehicle while he is propelling it; and it makes the use of legs under the shafts unnecessary; and it keeps the handles up out of the mud, whenever he lets loose of them. My vehicle is therefore purposely unbalanced to a slight extent, with the greater load being carried before the axle of the shaft, so that the operator has but to pull downwardly very slightly on the handles while moving the loaded cart.

Removable racks are provided in a position of unbalance before and/or above and before the axle of the vehicle to accommodate bulky objects; and the construction of my device is such that a rack extending in front of the axle may be nearly counter-balanced by a cart body carried above or behind the axle, and/or by another rack carried above the axle, whenever the racks and body are all loaded, and also whenever they are all empty. This is an important object.

My vehicle has many uses. It is provided with a light weight frame, mounted on relatively high wheels, which roll easily, and may have rubber tires. The hubs of the wheels do not extend outwardly beyond the vertical plane of the tires; and therefore no injury is done to door facings when the vehicle is pushed through a door opening.

A spring-kept hook is carried by an adjustable rod, which may be lowered or elevated in an attachment tube to accommodate the lifting of boxes, bales, cans and other objects of varying heights. This is an important advantage.

The vehicle may be inverted and made to carry plowshares and other tools for cultivating plants; and a removable body somewhat similar to that of a wheelbarrow may be carried by the vehicle, when the latter is in either upright or inverted position.

Therefore, among the objects of my invention will be found the following:

(a) An all purpose general utility vehicle, comprising a wheeled cart so designed and constructed that the greater weight of the vehicle lies forward of the axle, and the shafts for propelling the vehicle remain conveniently tilted and elevated, so that the load does not have to be lifted up by the operator and so that the handles always remain up out of the dirt; and this is so whether the cart be loaded or empty.

(b) A wheeled cart having means for hooking and lifting objects to be transported, and the hooking means being capable of adjustment to different elevations to accommodate the transportation of objects of different heights.

(c) In a general utility cart, a holding device provided with a plurality of hooks, each closed with a movable spring keeper, so that attachment to objects may be made secure while they are being transported, such attachment being manually releasable.

(d) Hooking means arranged to support the weight of objects attached thereto, so constructed that where a plurality of hooks are provided the weight carried thereby is disposed substantially before the axle of the cart, whether the hooks be arranged transversely or longitudinally of the cart, and means whereby either arrangement may be effected.

(e) A forward rack which more than counterbalances the weight of the cart handles when removably hung by a yoke over the frame of the cart and arranged to extend somewhat horizontally in advance of the axle.

(f) An upper rack disposed above and beyond the cart wheels, both laterally and longitudinally, the greater part of which is disposed anteriorly over the axle, legs to support the rack in a substantially horizontal elevated position allowing free movement of the cart wheels, and means for removably attaching the rear part of the rack to the cart handles or shafts.

(g) A cart body having a bottom narrower than its top and arranged to be carried in wedge-like contact between the shafts of the cart, and capable of being so placed upon the cart when the latter is in inverted position as well as when it is upright; and the body being capable of varied positions of counterbalance with respect to other loads on the vehicle, and particularly that of the forward rack.

(h) A general purpose vehicle which may be inverted to afford a cultivating device having an attachment tube extending toward the ground, and an adjustable rod within the tube as a means for carrying plowshares and other tools of cultivation.

Preferred forms of my device are shown in the accompanying drawings; and changes may be made in these forms without departing from the spirit of my invention; and in these drawings:

Fig. I is a perspective view of a typical cart.

Fig. II is a plan view of a typical cart without racks, as seen from above.

Fig. III is a partially sectionalized elevation of the left half of a typical cart carrying forward rack, viewed from the right side of the longitudinal median line of the cart.

Fig. IV is a partially sectionalized elevation of the left side of the cart, without racks, showing the attachment tube with adjustable hook.

Fig. V is a partially sectionalized elevational view of the vehicle indicated in Fig. IV, in inverted position and carrying cultivating attachment.

Fig. VI is a partially sectionalized elevational view of the attachment tube and adjustable hook, in normal vertical position.

Fig. VII is a perspective view of the axle housing and adjacent members, showing the forward rack in place.

Fig. VIII is a partially sectionalized elevation of the left half of a cart carrying upper rack only.

Fig. IX is a plan view of the upper rack and certain supporting members thereunder.

Fig. X is a partially sectionalized elevation of means for attaching the upper rack to the cart shafts.

Fig. XI is a partially sectionalized elevation of one of the two front legs of the upper rack.

Fig. XII is a front elevational view of a cart provided with modified frame.

Fig. XIII is a front elevational view of the cart shown in Fig. XII, but in inverted position and provided with a removable body.

Fig. XIV is a partially sectionalized side elevation of the cart shown in Fig. XII provided with body and arranged for carrying a can forward of the axle shaft.

In the drawings, which represent a typical vehicle, and a modified form thereof, the various elements and parts of the device are indicated by numerals, wherein like parts are given the same numeral, and in which the numeral 1 indicates the wheels of the vehicle; and the device is provided with shafts 2, connected at their rear ends with transverse handle 3, for pushing or hauling the cart about.

Between the two wheels of the vehicle there is a substantial tubular member comprising an axle housing 4, in which the axle 5 is carried. The axle and its indicated housing may be thus made as separate members; or in place of the two there may be substituted a single tubular or shaft-like member to form an axle; and in any event the shafts 2 may be fastened, through the use of welding or bolts or other means, to the axle housing, if one is provided, or directly to the axle itself, if there be no housing.

However constructed, the axle is made to extend horizontally beyond the shafts and into hubs 6 of the wheels; and spokes 7 radiate from each hub to the wheel felloe or band 1a; and the wheel 1 is finished with a tire 8, which may be made of metal, but preferably of resilient material such as rubber; and a pneumatic tire may be used.

The body beam 9 is a transverse member forming part of the frame of the vehicle; and it is supported by a pair of main struts 10, which may well be made as inclined or curving return members of the forward ends of the shaft 2, turned upwardly at a position anterior to the axle. To further complete and strengthen the frame and support the beam 9 there may be provided a pair of auxiliary struts 11.

In an upright position, slightly forward of the axle housing 4, there is arranged the attachment tube 12; and this tube is provided with a series of vertically spaced holes 13. A removable adjustment pin 14 is carried in one of these holes in a position appropriate to fasten and support the adjustment rod 15, which is also provided with adjusting holes 13a. Through the use of these complementary holes in the members 12 and 15 the latter may be raised or lowered and fixed in whatever position or elevation may be desired.

The slideable and adjustable rod 15 is surmounted by a hook plate 17; and welding 20 is used to attach the plate to the rod. This plate extends outwardly and is arranged to turn up to form a finger or hook 16; and a plurality of such hooks may be arranged about the plate, in whatever direction may be desired. Any of the hooks so fashioned may be used to hold and support chains, wires, cables, ropes or handles on boxes, bales, vessels or other objects to be transported by the cart.

Whenever such objects are to be attached to the hooks, the rod 15 may be dropped within the tube 12 to its lowest position, or to such position as will bring the hook just beneath the chain, cable or handle to be held on the hook. To further facilitate this operation the back ends of the shaft 2 may be elevated, and this will tilt forward and lower the tube 12. When this operation is being carried out the member 17 is elevated to a position allowing initial engagement of the hook with the object to be suspended thereby, and then the pin 14 is put in place to fix the hook at the desired elevation. When the rear end of the shafts are pulled downwardly toward the ground the hook will be elevated and the object carried thereby lifted free and clear of the ground or floor for transportation.

It is desirable to have a spring 18 carried between the hooks 16 to prevent any handle or other object engaged by the hook from slipping off. A simple but very effective spring may be formed from a flat strip of spring steel, slightly longer than the distance between the two opposed hook-lips 16a, so that the ends of the strip may find engagement thereunder, when pressed downwardly and rotated slightly. To facilitate this operation and to keep the spring in proper place, there is provided the spring cradle 19, which may be fashioned from a very short piece of tubing and welded on the upper face of the hook plate 17; or it may be fashioned as an integral part of the plate. In the middle of the spring and on its lower face there is provided a slight projection on dog 18a which fits into the cradle 19, allowing the spring to be rotated thereabout.

When a spring-hook is provided with only two fingers, these may be arranged longitudinally of the cart, so that one extends somewhat in advance of the axle of the cart, and the other one is carried substantially above the axle. This arrangement is made to carry out a desired unbalance in the vehicle, so that if equal weights were suspended from each of these fingers, the cart would tilt downwardly in front of the axle; and the shafts 2 would tilt upwardly to the rear.

This same condition of desirable unbalance would result if the two fingers of the hook were turned transversely across the vehicle, as in Fig. VII, because both would then be in a position anterior to the axle.

The hooks can be carried in either of these directions by simply providing the adjustment rod 15 with a series of holes therethrough at right angles to another series of holes therethrough; and the hooks will be kept in desired position and direction by the use of adjustment pin 14.

The attachment tube 12 should be firmly fixed in substantially upright position in front of the beam 9 and of axle housing 4; and one satisfactory form of making such attachment secure is through the use of welding 21 between members 9 and 12, and in the use of welding 22 between the members 4 and 12.

The vehicle presenting the form of its most common use is shown in Fig. I, wherein the forward rack 23 is made a part of the device. This rack is further shown in Figs. III and VII, the latter disclosing the manner of removable attachment to the frame of the vehicle. The forward rack is hung on the body beam 9 through the use of yoke 27, which is made to lie immediately behind the upright tube 12. From the yoke a pair of downwardly extending arms 26 lie against the front of axle housing 4; and these arms may be made to extend approximately horizontally to form the frame 28 of the forward rack 23. The yoke, the arms and the frame of this rack may be made of one tubular member, properly formed; or they may be made of separate members rigidly attached together through the use of welding or other firm means.

The forward rack should be made of light weight material; but it must be quite strong. Arranged between the side members of the frame there are light weight cross members 24. These may be made of stout wire, tubes or rods. However, a strong, light cable or cord may be laced between the parallel members of the frame by being looped about the latter or passed through holes therein. The preferred method of construction employs metallic cross members which may be welded to the frame 28 through the use of welding indicated as at 25.

The forward rack is a highly useful part of the device; and it will permit the carriage of a large volume of goods of considerable weight. The front end of the forward rack 23 will rest on the ground to facilitate the placing on the rack of bags of grain and other material, boxes and crates, milk cans and garbage pails and other objects to be transported. While being loaded and after it is loaded the front end of the forward rack will normally touch the ground; and when in this position the handle 3 of the vehicle will be in an elevated position.

Because the shafts 2 are quite long, there is considerable leverage afforded to the operator when he moves these shafts downwardly; and the result is that the load on the forward rack is easily lifted, and can be transported with little effort. A cable or chain may be thrown about the objects piled on the forward rack, and then be snapped into the hooks on plate 17. This will secure the goods from falling off the rack while being moved.

An upper rack 30 is provided on the vehicle; and it may be used at the same time that forward rack 23 is attached to the vehicle; and either rack may be used separately.

Upper rack 30 has a slightly greater part of its length extending forward of the axle of the cart; and when this rack is fully loaded (even without the use of the forward rack 23) it will cause the shafts 2 and the handle 3 to be tipped upwardly, so that the operator in moving the vehicle will not have to lift any part of the load carried by the rack, and the handle will be found conveniently elevated for pushing or pulling.

The upper rack is made with rectangular frame 31; and this frame and its floor may be made of any suitable material. A metal tube may be formed to define the rectangle, such material being strong and of light weight. Transverse metallic members 32 may be disposed between the side members of the frame 31 to form the open floor of the rack, and these may be welded thereto, through the use of welding 33.

It is to be noted that the upper rack may be made fully as wide as the maximum over-all width of the cart through its wheels; and the rack may be made slightly larger. Such a rack is very useful in carrying goods of considerable bulk, such as bales of hay, or grasses and fodder unbaled. Materials in sacks and other containers may be thrown on this rack and conveniently transported.

The upper rack is removably attached to the shafts 2; and to effect such attachment a socket 35 is made on the upper part of each of the shafts 2. This socket may be made of a short piece of pipe, attached to the shafts through the use of welding 36. The rear end member 31a, of the frame 31, has two short fingers 37 fastened thereto through the use of welding 38, so that these fingers look downwardly; and they are so positioned as to extend a short distance into sockets 35, where they may be removably held in place by fastening pin 39. This pin passes through companion holes in members 35 and 37, and may be kept in place by the use of a cotter key 34. Of course, a nut may be used for this purpose.

When the rear end of upper rack 30 is fastened, through the use of pin 39, this rack may be safely loaded and moved about with the cart. To support the rack above the cart wheels, allowing the latter to operate freely, there is provided a pair of inclined legs 40, the upper ends of which are attached to frame 31 by the use of welding 42; and the lower ends of these legs are split to form socket 41. This socket rests on axle housing 4.

A modified form of the frame of the vehicle is shown in Figs. XII, XIII and XIV, in which horizontal beam 43 takes the place of beam 9; and from member 43 there extends downwardly a pair of posts 47 (in place of the usual struts 10). Welding 44 may be used to connect members 47 and 4; and the welding 45 and 46 may be employed to attach adjustment tube 12 to the members 43 and 4.

The vehicle having the standard frame construction indicated in Fig. V, or having the modified frame construction indicated in Fig. XII, may be used as a cultivating device. For such use the vehicle is inverted; and the hook plate 17 is removed. A cultivating tool 52 may be selected from the many such commercial tools available, and be of any form or shape desired and suitable for the work to be done; and this tool is then attached to adjustment tube 12 of the vehicle.

To effect such attachment, and to make it entirely adjustable as to the location of the tool at or above or below grade, a rod 51 is provided. This rod is made exactly like rod 15, and carries the usual complement of holes therethrough. The only difference between rods 15 and 51 is that the latter carries a cultivating tool instead of a hook plate.

The tool may be removably attached to the rod by bolts, so that other tools may be substituted therefor. In fact, a single rod may be used for all the purposes intended for either rod, provided the hook plate 17 be removably attached thereto, as with machine screws or bolts. In any event, it should be quite evident that the inverted vehicle, carrying adjustable tool 52 may be used to cultivate plants, or otherwise cut the earth in furrows.

A substantially rectangular cart body 50, is made to have a slightly narrower width at its bottom than at its top; and it is constructed of such size and dimensions that the slightly narrowed bottom will fall between the shafts 2, and be held there by frictional engagement. This body may be thus mounted on the standard cart frame, or on the modified form of cart, as is indicated in Figs. XIII and XIV. When the body is placed on the modified cart while the latter is in upright position, then the whole of the body will fall back of adjustment tube 12. This modified cart may be inverted, as shown in Fig. XIII; and in this position the body member 50 may be set upon the axle housing 4 in such way that the rear end of this body will fall within and slightly below the shafts 2; and the front end of this body will extend some distance before the axle of the vehicle.

When the body member 50 is mounted on the cart as shown in Fig. XIV, it will permit the picking up of large and heavy objects attached to the hook plate 17 and suspended forward of the vehicle's axle. For instance, the can 48 may be thus transported, and in a position to overbalance the weight of the body 50.

From the foregoing it will be seen that I have created a general utility vehicle provided with a removable spring-controlled hooking device which can be adjustably raised and lowered, to engage objects to be suspended from the ground in a position anterior to the axle of the vehicle, and objects varying in height can thus be easily lifted and transported; and my general purpose vehicle is provided with a pair of removable racks, one before the axle and one above the axle, and these racks are so constructed and attached that the greater part of their weight is in front of the axle; and the cart may be made to carry a removable body so adjustable along the shafts of the cart as to act as a counterbalance to overcome the weight of objects carried by the vehicle before its axle; and the design of the vehicle is such that the shafts and handle are always naturally elevated above the ground in convenient position to be grasped by the operator; and the vehicle is capable of being inverted, so that its adjustment tube may be made to carry tools for the cultivation of plants, so adjusted that they may be made to enter the ground to adjustably varying depths, when the vehicle is pulled or propelled along the surface; and the adjustment tube is provided with an adjustable rod which may be made to removably carry either the hooking device or the cultivating tools; and the whole vehicle is adaptable to a great variety of utilitarian uses.

I claim:

In a general utility vehicle, a frame provided with a pair of wheels for traverse over the ground; and hooking means capable of adjustable elevation above the frame and carried thereby; said means having a pair of opposedly disposed upturned fingers, and being provided with a spring arranged between these fingers, and in contact therewith, and the spring being so constructed as to securely hold objects hooked on the fingers and prevent their slipping off.

SIDNEY E. NIELSEN.

REFERENCES CITED

The following references are of record in the file of this patent:

UNITED STATES PATENTS

| Number | Name | Date |
|---|---|---|
| D. 146,227 | Mader | Jan. 14, 1947 |
| 601,008 | Trisler | Mar. 22, 1898 |
| 909,297 | Helgeson | Jan. 12, 1909 |
| 978,344 | Wirt | Dec. 13, 1910 |
| 1,382,566 | Strauch | June 21, 1921 |
| 1,728,081 | Rust | Sept. 10, 1929 |
| 2,373,279 | Vogt | Apr. 10, 1945 |
| 2,396,325 | Jimenez | Mar. 12, 1946 |